B. C. SKINNER.
FRUIT GRADING AND ASSORTING MACHINE.
APPLICATION FILED FEB. 10, 1919.

1,321,677.

Patented Nov. 11, 1919.
3 SHEETS—SHEET 1.

WITNESSES

INVENTOR
Bronson Cushing Skinner,
BY
ATTORNEYS

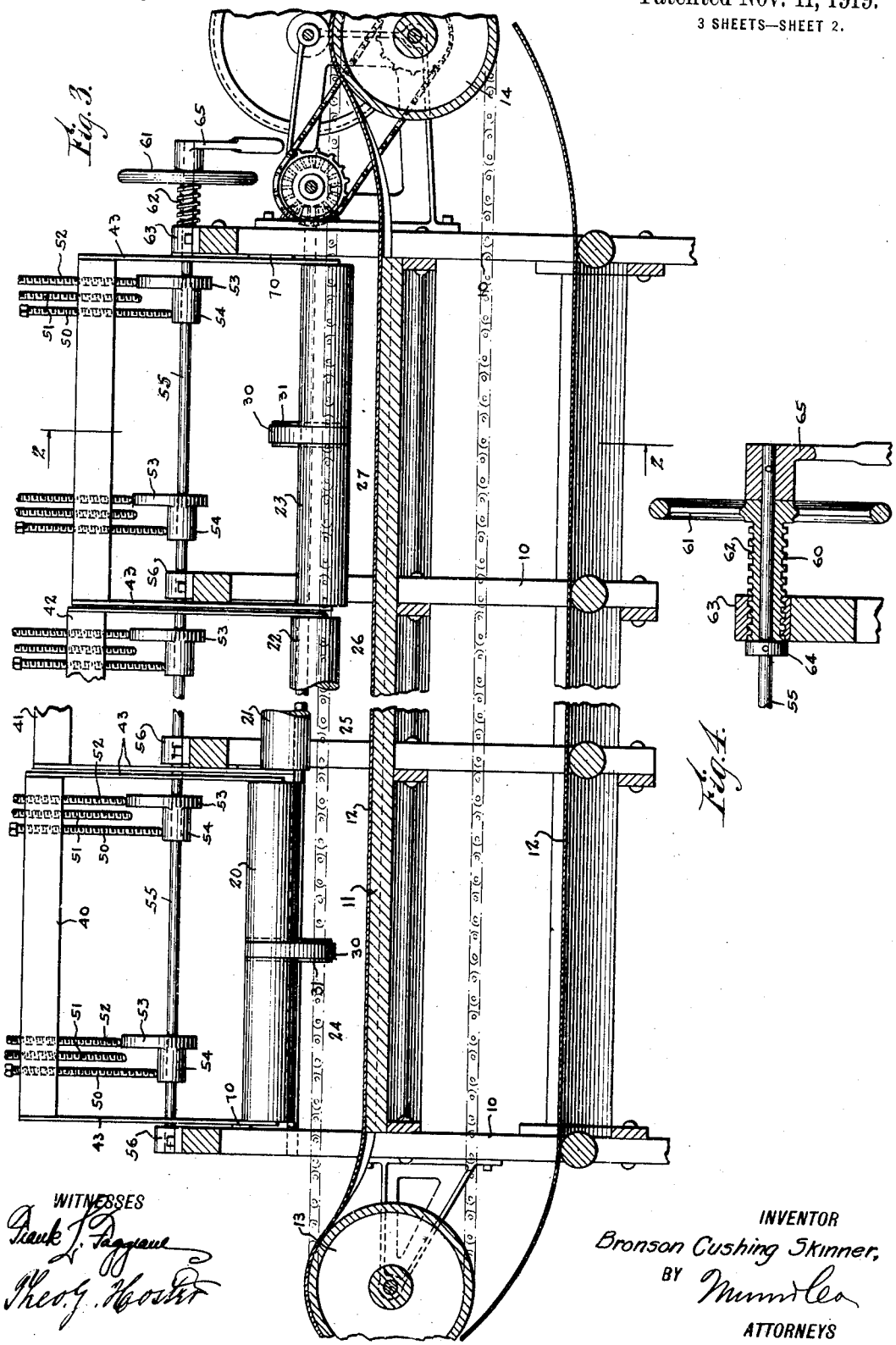

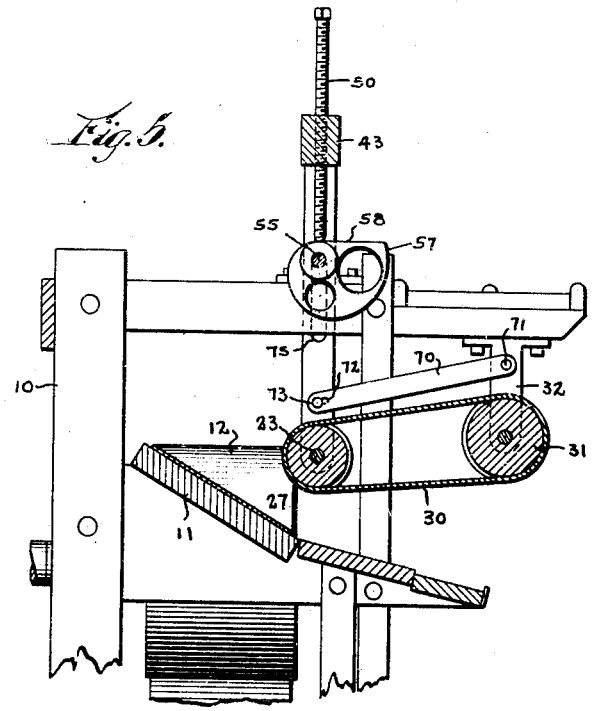
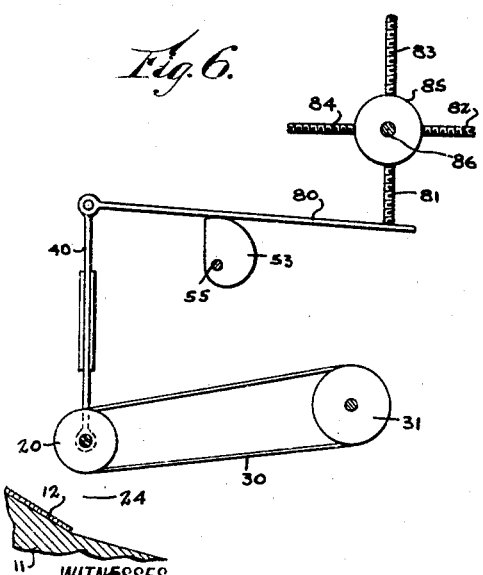
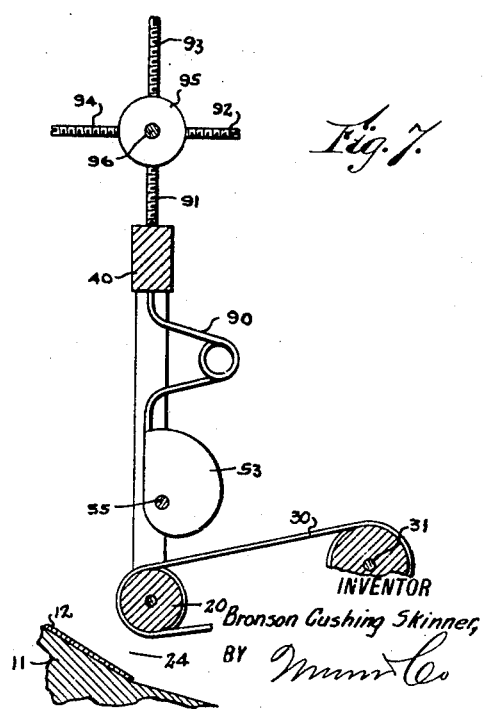

UNITED STATES PATENT OFFICE.

BRONSON CUSHING SKINNER, OF DUNEDIN, FLORIDA, ASSIGNOR TO L. B. SKINNER M'F'G CO., OF DUNEDIN, FLORIDA, A CORPORATION OF FLORIDA.

FRUIT GRADING AND ASSORTING MACHINE.

1,321,677.     Specification of Letters Patent.     Patented Nov. 11, 1919.

Application filed February 10, 1919. Serial No. 276,140.

*To all whom it may concern:*

Be it known that I, BRONSON CUSHING SKINNER, a citizen of the United States, and a resident of Dunedin, in the county of Pinellas and State of Florida, have invented new and useful Improvements in Fruit Grading or Assorting Machines, of which the following is a full, clear, and exact description.

The invention relates to fruit grading or assorting machines using a runway comprising coöperative parallel members, one of which consists of a series of rolls arranged end to end and disposed progressively at different distances from the other member to form communicating fruit discharging passages of progressively different widths along the runway.

The object of the invention is to provide certain new and useful improvements in fruit grading or assorting machines of the type mentioned whereby the machine can be readily and quickly set for grading different fruit such, for instance, as oranges, tangerines and grapefruit. Another object is to enable the user to quickly set the machine from one fruit to another after the machine is once set to suit the user's wants, and without requiring readjustment of the setting. Another object is to permit of readily applying the improvements to fruit grading or assorting machines that are now on the market, such, for instance, as is shown and described in the Letters Patent of the United States No. 888,408, granted to Robert Strain on May 19, 1908.

With these and other objects in view the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Fig. 3 is a longitudinal section of the same on the line 3—3 of Fig. 2;

Fig. 4 is an enlarged longitudinal section of the adjusting device for the cam shaft;

Fig. 5 is a cross section of the fruit grading or assorting machine set for different fruit; and Figs. 6 and 7 are cross sections of modified forms of the means for adjusting the frames carrying the grading rolls.

Figure 1:
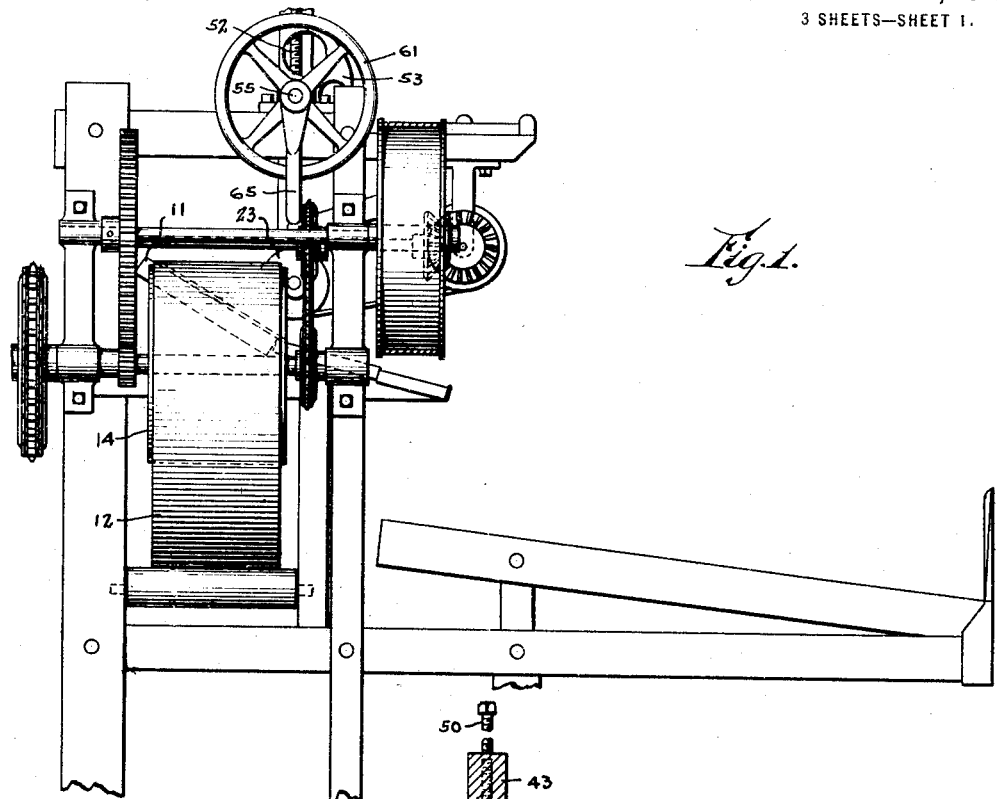
Figure 1 is an elevation of one end of the fruit grading or assorting machine.
Figure 2:
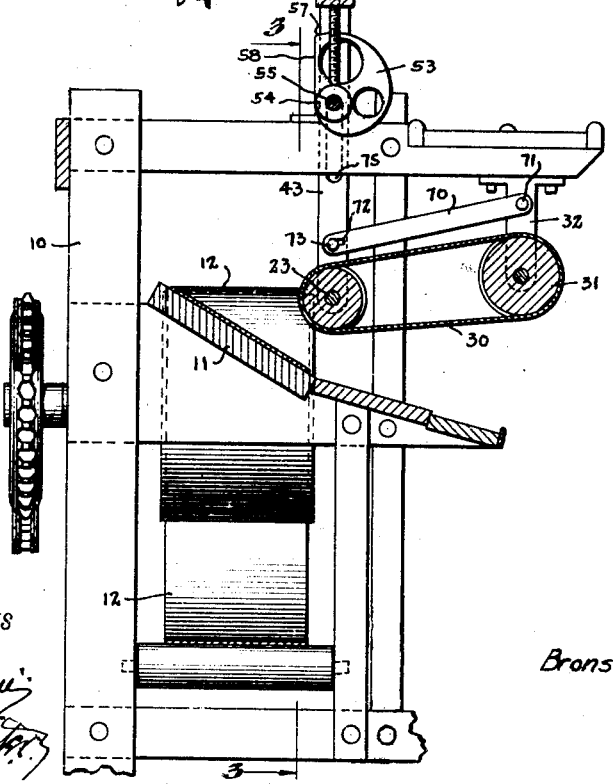
Fig. 2 is a transverse section of the same on the line 2—2 of Fig. 3.

The fruit grading or assorting machine is mounted on a suitably constructed frame 10 provided with a longitudinally extending inclined support 11 over which passes the upper run of an endless conveyer belt 12 passing around two drums 13 and 14 journaled on the main frame 10 and on which the drum 14 is driven by suitable means to cause the belt 12 to travel in the direction of the arrow indicated in Fig. 3. The endless conveyer belt 12 coöperates with a series of grading rolls, at least, two in number but usually more than two, for instance as shown in Fig. 3, four grading rolls 20, 21, 22 and 23 are disclosed to provide four different sized passages 24, 25, 26 and 27 between the rolls and the upper run of the belt to correspondingly grade a fruit fed onto the upper run of the belt 12 and carried along by the same. Around each of the grading rolls 23 extends a belt 30 passing around a guide roll 31 journaled in suitable brackets 32 attached to or forming part of the main frame 10. The rollers 20, 21, 22 and 23 are journaled in frames 40, 41, 42 and 43, and in each frame screw a number of screw rods preferably arranged in sets with two sets for each frame and each set containing a number of screw rods corresponding to the number of fruits to be graded. Thus if the machine i designed for grading tangerines, oranges and grapefruit, for instance, then three screw rods 50, 51 and 52 are mounted to screw vertically in each set of screw rods in a frame, and each of the said screw rods of a roller frame 40, 41, 42 or 43 is adapted to register with a cam 53, and the hubs 54 of the several cams 53 are secured on a cam shaft 55 journaled in suitable bearings 56 mounted on the main frame 10. Each of the cams 53 is provided with a spiral face portion 57 and a flat portion 58, as plainly indicated in Fig. 5, the flat portion connecting the ends of the spiral portion with each other, the spiral having its beginning on the peripheral face of the corresponding hubs 54.

In order to shift the cam shaft 55 with a view to move the cams 53 into register with the corresponding screw rods 50, 51 and 52 the following arrangement is made, special reference being had to Figs. 3 and 4: On the cam shaft 55 near the right hand end thereof is mounted to turn loosely the hub 60 of a hand wheel 61, and the hub 60 is provided with an external screw thread 62 screwing into a nut 63 attached to the main frame 10, and one end of the hub 60 abuts against a collar 64 attached to the cam shaft 55 and the other end of the hub abuts against a handle 65 screwed on the right hand end of the cam shaft 55 to allow the operator to turn the said cam shaft with a view to raise or lower the roller frames 40, 41, 42 and 43 simultaneously as hereinafter more fully explained. It will be noticed that the operator on turning the hand wheel 61 in one direction causes the cam shaft 55 and its cams 53 to move from the right to the left and on turning the said hand wheel 61 in the opposite direction the cam shaft 55 is caused to move from the left to the right. Thus the cams 53 can be moved into register with either of the screw rods 50, 51, or 52 and on turning the shaft 55 by the operator manipulating the handle 64 the frames 40, 41, 42 and 43 are correspondingly raised or lowered.

In order to permit of lengthwise movement of the shaft 55 it is necessary for the operator first to turn the cam shaft 55 to the position shown in Fig. 5, that is, with the flat portion 58 of the cams disposed horizontally to allow the lowermost screw rods to rest on the hubs 54 of the cams. When the cam shaft 55 has been shifted to move the cams into register with the desired screw rods 50, 51 or 52 then the operator turns the shaft 55 in the direction of the arrow in Fig. 5 to cause the screw rods in register with the cams to travel up the spiral portions 57 until the spiral portions 57 reach uppermost positions thus holding the rolls 20, 21, 22 and 23 the desired distance from the conveyer belt 12 for forming the fruit discharging passages 24, 25, 26 and 27 of preferably different width, as above explained. It is understood that the user of the machine sets the screw rods 50, 51 and 52 for each frame according to the desired width of the grading passage to be formed. Say the screw rods 50 are adjusted for grading tangerines, the screw rods 51 are set for grading oranges, and the screw rods 52 are set for grading grapefruit, and hence the user of the machine after this setting has been once made can readily convert the machine for grading either tangerines, oranges or grapefruit without requiring re-adjustment of the setting of the screw rods. It is understood that for such converting of the machine from one fruit to another it is only necessary to manipulate the hand wheel 61 and the handle 65 in the manner above explained.

The roll frames 40, 41, 42 and 43 are guided in their up and down movement by guideways 70 pivoted at 71 on the brackets 32 and provided with slots 72 through which extend pins 73 held on the side arms of the roll frames 40, 41, 42 and 43. The side arms of the roll frames are provided with slots 75 through which extends the cam shaft 55 whereby the latter in conjunction with the links 70 forms a guiding means to insure proper up and down movement of the frames 40, 41, 42 and 43 when raised or lowered by the action of the cams 53, as above explained.

The means for raising and lowering the roll frames 40, 41, 42 and 43 and setting the same selectively according to the kind of fruit, nut or other article to be graded may be varied without deviating from the spirit of my invention; for instance, as shown in Fig. 6, the cams 53 on the cam shaft 55 engage levers 80 connected with the roll frames 40, 41, 42 and 43, and each of the levers 80 is adapted to engage a screw rod 81, 82, 83 or 84 radiating from a hub 85 secured on a shaft 86 adapted to be turned by the operator to move any one of the screws 81, 82, 83 or 84 into active position relative to the lever 80.

In the modified form shown in Fig. 7 each cam 53 is connected by a spring 90 with the corresponding frame 40, 41, 42 or 43, and the top of the roll frame 40 is adapted to abut against a screw rod 91, 92, 93 or 94 radiating from a hub 95 secured on a shaft 96 adapted to be turned by the operator to move any one of the screw rods 91, 92, 93 or 94 into abutting position relative to the corresponding roll frame to limit the rising movement thereof.

From the foregoing it will be seen that by the arrangement described, the user of the machine can set the machine for sizing the several varieties of fruit growing in the neighborhood and when once set needs no readjustment but permits the user to quickly shift the cam shaft 55 and its cams 53 to the desired position relative to the screw rods 50, 51 or 52 according to the variety of fruit to be graded at the time.

It is understood that the endless conveyer belt 12 coöperating with the series of grading rolls 20, 21, 22 and 23 forms a grading device for grading a particular fruit at the time the sets of screw rods 50, 51 and 52 constitute adjusting devices for the grading device, and the cams 53 provide setting devices for setting the grading devices for various kinds of fruit.

Although I have shown and described the setting and adjusting means as applied to one particular type of a grading machine, I do not limit myself to this application as the setting and adjusting means may be applied to other types of grading machines.

Having thus described my invention, I claim as new and desire to secure by Letters Patent:

1. In a fruit grading or assorting machine, a grading device having a plurality of grading members, and means for simultaneously adjusting the said grading members for grading various kinds of fruit.

2. A fruit grading or assorting machine having a grading device provided with a plurality of grading members, and a plurality of adjusting devices for simultaneously adjusting the said grading members for adjusting the said grading device for grading different fruits, each adjusting device being individually adjustable for adjusting the corresponding grading member for a particular size of the fruit for which the machine is set at a time.

3. In a fruit grading or assorting machine, a grading device having a plurality of grading members and a plurality of adjusting devices, either one of which is adapted to simultaneously coact with the said grading members of the grading device to set the latter for grading various kinds of fruit.

4. In a fruit grading or assorting machine, a grading device, a plurality of adjustable screw rods, and manually controlled means for setting the grading device by means of either one of the said screw rods for grading various kinds of fruit.

5. In a fruit grading or assorting machine, a grading device provided with a plurality of adjustable screw rods, and means controlled by an operator for engaging either of the said screw rods to set the grading device for grading various kinds of fruit.

6. In a fruit grading or assorting machine, a grading device provided with a frame, a series of screw rods adjustable on the said frame, and a cam shaft mounted to turn and to slide and provided with a cam adapted to engage either one of the said screw rods.

7. In a fruit grading or assorting machine, coöperating members, one of the said members consisting of a series of revoluble rolls arranged end to end and disposed progressively at different distances from the other member, forming discharging passages of progressively different widths along the runway, frames in which the said rolls are independently journaled, screw rods screwing in each of the said frames, a cam shaft mounted to slide lengthwise and adapted to be turned, and cams on the said cam shaft, one for each frame and each adapted to be moved into register with any one of the corresponding screw rods.

8. In a fruit grading or assorting machine, coöperating members, one of the said members consisting of a series of revoluble rolls arranged end to end and disposed progressively at different distances from the other member, forming discharging passages of progressively different widths along the runway, frames in which the said rolls are independently journaled, screw rods screwing in each of the said frames, a cam shaft mounted to slide lengthwise and adapted to be turned, cams on the said cam shaft, one for each frame and each adapted to be moved into register with any one of the screw rods on the corresponding frame, a wheel on the said shaft having a threaded hub, a fixed nut in which screws the said hub to shift the shaft lengthwise, and a handle on the said shaft for turning the latter.

9. In a fruit grading or assorting machine, coöperating members, one of the said members consisting of a series of revoluble rolls arranged end to end and disposed progressively at different distances from the other member, forming discharging passages of progressively different widths along the runway, frames in which the said rolls are independently journaled, a set of screw rods screwing in each of the said frames, and a cam shaft mounted to slide lengthwise and adapted to be turned, cams on the said cam shaft, one for each frame and each cam being adapted to be moved into register with any one of the screw rods of the corresponding set of screw rods, each cam having a portion of its peripheral face in the form of a spiral.

10. In a fruit grading or assorting machine, a grading device comprising a plurality of grading members and an endless conveyer belt coöperating with said plurality of grading members, and means for simultaneously adjusting the said conveyer belt and the said series of grading members one relative to the other to set the grading device for grading various kinds of fruit.

11. In a fruit grading or assorting machine, a grading device comprising a plurality of grading members and an endless conveyer belt coöperating with said plurality of grading members, adjusting means for individually adjusting the said grading members relative to the said conveyer belt, and setting means for simultaneously setting the grading device for grading various kinds of fruit.

BRONSON CUSHING SKINNER.